(12) United States Patent
Yazawa

(10) Patent No.: US 6,283,630 B1
(45) Date of Patent: Sep. 4, 2001

(54) TEMPERATURE MEASURING METHOD USING RADIATION THERMOMETER

(75) Inventor: Minoru Yazawa, Yamanashi-Ken (JP)

(73) Assignee: Tokyo Electron Limited, Tokyo-to (JP)

( * ) Notice: Subject to any disclaimer, the term of this patent is extended or adjusted under 35 U.S.C. 154(b) by 0 days.

(21) Appl. No.: 09/414,888

(22) Filed: Oct. 8, 1999

(30) Foreign Application Priority Data

Oct. 9, 1998 (JP) .................................................. 10-288034

(51) Int. Cl.$^7$ ............................... G01J 5/00; G01K 19/00
(52) U.S. Cl. .................................. 374/128; 374/126; 374/1
(58) Field of Search ..................................... 374/126, 128, 374/1, 18, 19, 179, 161

(56) References Cited

U.S. PATENT DOCUMENTS 5,255,286 * 10/1993 Moslehi et al. ....................... 374/121
5,265,957 * 11/1993 Moslehi et al. ........................... 374/1

* cited by examiner

Primary Examiner—Diego Gutierrez
Assistant Examiner—Gail Verbitsky
(74) Attorney, Agent, or Firm—Smith, Gambrell & Russell, LLP

(57) ABSTRACT

A temperature measuring method measures the temperature of a measuring object, such as a semiconductor wafer, by a radiation thermometer capable of approximating the relation between its output and the temperature of the measuring object by a predetermined straight line and of being calibrated by properly determining a slope and a y-intercept for the straight line. The measuring method carries out a procedure including the steps of measuring the reflectivity of a measuring object regarding the light of a wavelength that is not transmitted by the measuring object, and determining a slope and a y-intercept for a proper straight line for the measuring object on the basis of results of processing the measuring object by a predetermined process, such as a film forming process, that provides a result, such as the thickness of a film, corresponding to process temperature. The procedure is repeated for a plurality of measuring objects to determine the relation between the reflectivity of the measuring object, and the slope and y-intercept of the proper straight line. The radiation thermometer is calibrated on the basis of the relation, and the temperature of the measuring objects is measured.

8 Claims, 4 Drawing Sheets

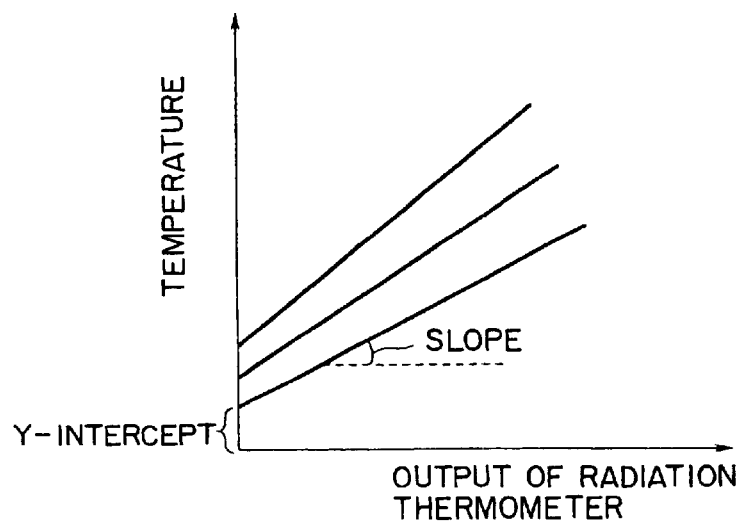
F I G. 2
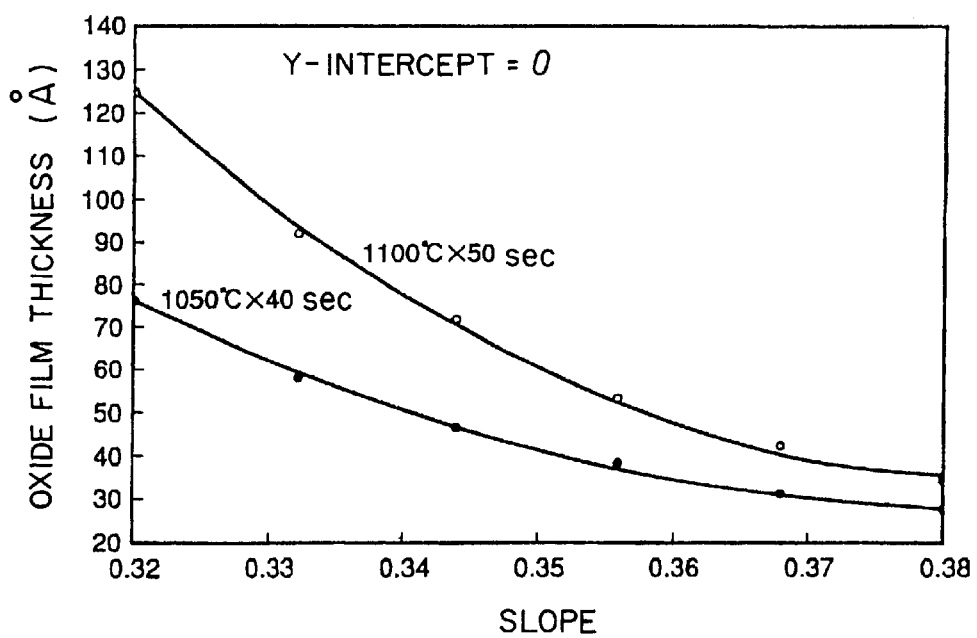
F I G. 3

TEMPERATURE MEASURING METHOD USING RADIATION THERMOMETER

BACKGROUND OF THE INVENTION

1. Field of the Invention

The present invention relates to a temperature measuring method using a radiation thermometer for measuring the temperature of a measuring object, such as a semiconductor wafer, and capable of calibrating the radiation thermometer before temperature measurement.

2. Description of the Related Art

Semiconductor device manufacturing methods include various heat treatment process, such as an annealing process for annealing a semiconductor wafer after a predetermined impurity has been added to the wafer by a doping process, and various thermal processes, such as film forming processes and etching processes. Since the temperature of the wafer is a significant parameter of the heat treatment process and the thermal process, the control of the temperature of the semiconductor wafer is very important.

A reference value of the result of processing for each recipe, i.e. a value of the result of processing possibly accurately reflecting the effect of the temperature prescribed by each recipe is determined. The reference value of the result of processing for each recipe may be the result obtained when the process is carried out according to the recipe while the temperature of the measuring object is measured by the radiation thermometer calibrated on the basis of temperatures measured by a thermocouple attached to the measuring object.

A radiation thermometer is used for the measurement of the temperature of a semiconductor wafer in a relatively high temperature range. The radiation thermometer measures the intensity of the thermal radiation of a measuring object and determines a temperature on the basis of the measured intensity of the thermal radiation. The emissivity of the semiconductor wafer is dependent on the surface roughness of the semiconductor wafer and the thickness of a film formed on the surface of the semiconductor wafer. Therefore, the temperature of the semiconductor wafer cannot accurately be measured by the radiation thermometer.

SUMMARY OF THE INVENTION

The present invention has been made in view of such a problem and it is therefore an object of the present invention to provide a temperature measuring method capable of accurately measuring the temperature of a measuring object by a radiation thermometer regardless of the surface condition of the measuring object.

The inventors of the present invention made studies to solve the foregoing problem and acquired knowledge that the reflectivity of a measuring object measured by using light of a wavelength that is not transmitted by the measuring object corresponds to the emissivity of the measuring object. A correction table for correcting a measured emissivity was produced on the basis of the reflectivity of the surface of a measuring object and the temperature of the measuring object measured by a thermocouple attached to the measuring object, and the emissivity was corrected by using the correction table.

However, the state of contact of the thermocouple with the measuring object was not reproducible and changed every time the thermocouple is attached to the measuring object. Consequently, measured temperature included an error and hence an accurate correction table could not be produced.

The inventors of the present invention made further studies and acquired knowledge that an accurate correction table can be produced on the basis of the reflectivity of a measuring object, and results of processing the measuring object by a process that provides a result corresponding to process temperatures, and that the temperatures of measuring objects can accurately be measured by a radiation thermometer even if the emissivities of the measuring objects differ from each other due to the difference between the measuring objects in surface condition, such as surface roughness.

The present invention has been made on the basis of the knowledge thus acquired. According to a first aspect of the present invention, a temperature measuring method of measuring a temperature of a measuring object by a radiation thermometer capable of approximating the relation between its output and the temperature of the measuring object by a predetermined straight line and of being calibrated by properly determining a slope and a y-intercept for the straight line, comprises the steps of repeating a procedure including the steps of measuring the reflectivity of a measuring object regarding the light of a wavelength that is not transmitted by the measuring object, and determining a slope and a y-intercept for a proper straight line for the measuring object on the basis of results of processing the measuring object by a process that provides a result corresponding to process temperature, for a plurality of measuring objects, to determine the relation between the reflectivity of the measuring object, and the slope and y-intercept of the proper straight line, and calibrating the radiation thermometer on the basis of the relation, and measuring a temperature of the measuring object.

According to a second aspect of the present invention, a temperature measuring method of measuring a temperature of a measuring object by a radiation thermometer capable of approximating the relation between its output and the temperature of the measuring object by a predetermined straight line and of being calibrated by properly determining a slope and a y-intercept for the straight line comprises the steps of: preparing a plurality of measuring objects differing from each other in surface condition and measuring the reflectivity of each measuring object regarding the light of a wavelength that is not transmitted by the same measuring object; determining a slope and a y-intercept for a proper straight line for each measuring object; determining the relation between the reflectivity of the measuring object, and the proper slope and y-intercept for the proper straight line on the basis of the determined slope and y-intercept for the straight line for each measuring object and the measured reflectivity of each measuring object; and calibrating the radiation thermometer on the basis of the relations and measuring a temperature of the measuring object; in which the step of determining a slope and a y-intercept for the straight line comprises the steps of: setting a plurality of slopes and a plurality of y-intercepts for the straight line, measuring temperature by the radiation thermometer by using each set of the slope and y-intercept for the straight line and subjecting the measuring object to a predetermined process that provides a result corresponding to process temperature by two recipes; expressing the result of processing by an equation as a function of the slope and y-intercept of the straight line for each recipe; determining reference value of the result of processing for each recipe; and calculating a slope and a y-intercept for a proper straight line for the measuring object by substituting the reference value into the equation for each recipe.

According to the present invention, a procedure for measuring the reflectivity of a measuring object regarding the light of a wavelength that is not transmitted by the measuring object, and for determining a slope and a y-intercept for the proper straight line for the measuring object on the basis of results of processing the measuring object by a process that provides a result corresponding to process temperatures is repeated for a plurality of measuring objects to determine the relation between the reflectivity of the measuring object, and the slope and y-intercept of the proper straight line, the radiation thermometer is calibrated on the basis of the relation, and the temperature of a measuring object is measured. Therefore, the radiation thermometer can accurately be calibrated even if different measuring objects have different surface conditions and different reflectivities. Problems resulting from an error in the measured temperature due to the variable contact condition of the thermocouple can be avoided by using the result of processing corresponding to process temperature instead of a temperature measured by the thermocouple. Consequently, the temperature of the measuring object can accurately be measured by the radiation thermometer.

More concretely, a plurality of measuring objects respectively having different surface conditions are prepared, the reflectivity of each measuring object is measured by illuminating each measuring object with light of a wavelength that is not transmitted by the measuring object, and a slope and a y-intercept for a proper straight line representing the relation between the output of the radiation thermometer and the temperature of the measuring object are determined.

To determine the slope and y-intercept for the proper straight line for each measuring object, a plurality of slopes and a plurality of y-intercepts are set, temperature is measured by the radiation thermometer by using each set of the slope and y-intercept for the straight line, and each measuring object is subjected to a process that provides a result corresponding to process temperature by the two recipes (temperature conditions).

Measured temperatures of the measuring objects determined by calibrating the output of the radiation thermometer by using the plurality of slope-y-intercept sets, respectively, are different from each other even if the measuring objects are processed by the same recipe; that is, the results of the process differ from each other according to the process temperatures determined by the radiation thermometer by using the different slope-y-intercept sets.

Consequently, the result of processing for each recipe can be expressed by an equation as a function of the slope and y-intercept of the straight line.

These values are substituted into the equation corresponding to each recipe, and a slope and a y-intercept for a proper straight line for the measuring object can be calculated by using two equations produced by substituting those values into the equation.

The foregoing procedure is carried out for each measuring object to determine a slope and a y-intercept for a proper straight line for each measuring object.

The relation between the reflectivity of the measuring object, and the slope and y-intercept of the proper straight line is determined on the basis of the determined slope and y-intercept of the straight line determined for each measuring object, and the measured reflectivity of each measuring object. Accordingly, the temperature of the measuring object can accurately be measured regardless of the surface condition of the measuring object by measuring the temperature of the measuring object by the radiation thermometer calibrated on the basis of those relations without entailing problems attributable to a temperature error due to the different contact condition of the thermocouple.

An error in the temperature measured by the radiation thermometer is affected slightly not only by the difference in the reflectivity of the measuring object, but also by radiation noise in a processing system in which the measuring object is placed. According to the present invention, a predetermined process is executed actually in the processing system and the radiation thermometer is calibrated on the basis of the results of execution of the process in the processing system. Therefore, when actually measuring the temperature during the same process, the radiation thermometer is calibrated accurately taking into consideration the influence of the radiation noise generated in the processing system.

Preferably, the process that provides a result corresponding to process temperature is a film forming process, such as an oxidation process for forming an oxide film on a silicon wafer. The thickness of a film formed by such a film forming process corresponds accurately to process temperature. Therefore, the temperature of the measuring object can very accurately be measured by employing a film forming process, such as an oxidation process for forming an oxide film in the foregoing measuring method.

BRIEF DESCRIPTION OF THE DRAWINGS

The above and other objects, features and advantages of the present invention will become more apparent from the following description taken in connection with the accompanying drawings, in which:

FIG. 2 is a graph showing calibration lines for calibrating a radiation thermometer;

FIG. 3 is a graph showing the relation between oxide film thickness and the slope of a calibration line for recipes prescribing process conditions of 1100° C.×50 sec and 1050° C. ×40 sec for annealing processes;

DESCRIPTION OF THE PREFERRED EMBODIMENTS

The following description will be made on an assumption that the measuring object is a silicon wafer, and the predetermined process is an oxidation process (thermal process) for forming an oxide film on a surface of the silicon wafer.

Processing Apparatus Using Temperature Measuring Method

Figure 1:
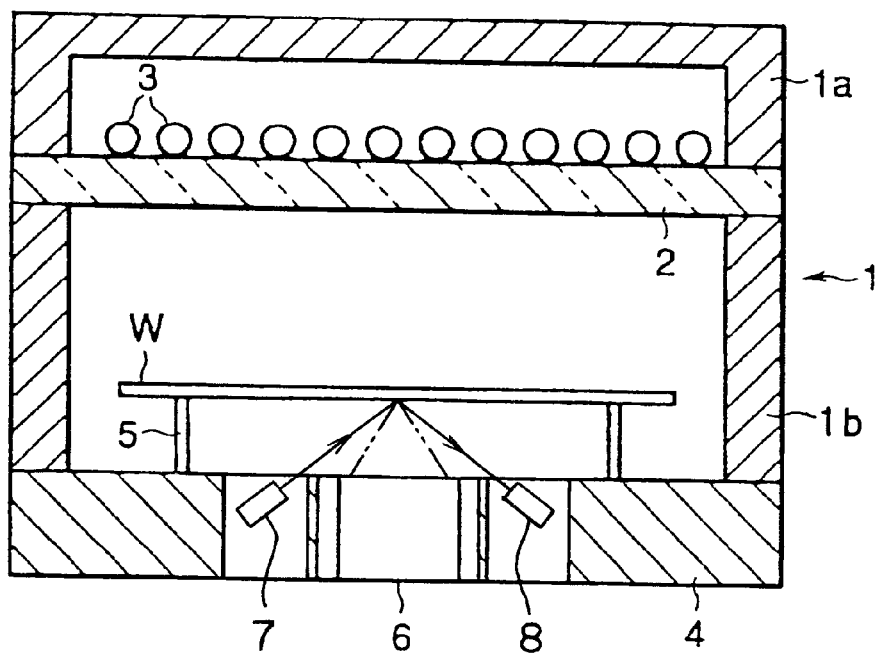
FIG. 1 is a schematic sectional view of a lamp annealer to which a temperature measuring method according to the present invention is applied.

Referring to FIG. 1, a lamp annealer, i.e., processing apparatus, using a temperature measuring method according to the present invention has a processing vessel 1 having quartz window 2 partitioning the interior of the processing vessel 1 into an upper chamber 1a and a lower chamber 1b. A plurality of lamps 3, such as tungsten lamps, are arranged along the quartz window 2 in the upper chamber 1a.

The processing vessel 1 has a bottom wall defining the bottom of the lower chamber 1b and serving as a wafer support member 4. A silicon wafer W is supported on support pins 5 projecting upward from the wafer support member 4. When necessary, the processing vessel 1 can be evacuated by an evacuating system, not shown.

A radiation thermometer 6 is disposed in a central part of the wafer support member 4. The radiation thermometer 6 measures the temperature of the silicon wafer W by detecting the thermal radiation emitted by the silicon wafer W from the back surface of the same. The radiation thermometer 6 detects light having a wavelength of, for example, 5 $\mu$m.

When processing the silicon wafer W by the lamp annealer, the silicon wafer W is disposed in the processing vessel 1 and, when necessary, the interior of the processing vessel 1 is evacuated by an evacuating system to a desired pressure. The silicon wafer W is heated by irradiating the same with light emitted by the lamps 3 and transmitted through the quartz window 2 for an oxidation process (annealing process) to form an oxide film over the surface of the silicon wafer W.

Silicon wafers W respectively having back surfaces differing from each other in surface conditions, such as surface roughness, have different emissivities, respectively. Therefore the emissivities need correction according to the surface condition. A temperature measuring method using a radiation thermometer and calibrating the radiation thermometer will be described hereinafter.

Temperature Measuring Method

FIG. 2 is a graph of assistance in explaining a method of calibrating a radiation thermometer for emissivity (more precisely, the calibration of the output taking into consideration the difference in emissivity), in which the output of the radiation thermometer is measured to the right on the horizontal axis, and the temperature of a silicon wafer is measured upward on the vertical axis. As shown in FIG. 2, the relation between the output of the radiation thermometer and the temperature of the wafer can be approximated by a predetermined straight line. More concretely, the outputs of the radiation thermometer are linearized by a circuit or the like so that the relation between temperatures measured directly by a thermocouple attached to the wafer and the outputs of the radiation thermometer can be approximated by a straight line.

An optional slope and an optional y-intercept can be determined by a circuit or the like for the straight line. The radiation thermometer can be calibrated for emissivity to provide correct output by properly determining the slope and y-intercept of the straight line. A straight line representing such a relation between the output of the radiation thermometer and the temperature of the silicon wafer (measuring object) will be referred to as "calibration line".

When the emissivity changes owing to change in the surface roughness (surface condition) of the back surface of the silicon wafer W, the slope and y-intercept of the proper calibration line change accordingly. Therefore, the slope and y-intercept of the proper calibration line must be determined according to the surface condition of the back surface of the silicon wafer W.

The dependence of emissivity on the surface condition of the back surface of the wafer W is determined through the measurement of the reflectivity of the wafer W regarding the light of a wavelength that is not transmitted by the wafer W. The light of a wavelength that is not transmitted by the wafer W is used because only the reflectivity corresponds to the emissivity when the wafer W does not transmit the light, i.e., when the wafer W has a transmittance of naught to the light.

As mentioned above, the radiation thermometer 6 employed in this embodiment is capable of detecting light of 5 $\mu$m in wavelength. The transmittance of silicon wafers is dependent on temperature and silicon wafers are virtually opaque (the transmittance of silicon wafers is substantially naught) to the light of such a wavelength at temperatures not lower than 600° C., i.e., a process temperature for an actual thermal process (oxidation process).

The reflectivity of the back surface of the silicon wafer W is measured at a relatively low temperature before the thermal process. Therefore, a reflectivity measured by using the light of 5 $\mu$m in wavelength at such a low temperature is different from that of the silicon wafer W in the thermal process and hence a different reflectivity is obtained. Therefore, it is preferable to use light of a shorter wavelength for reflectivity measurement to ensure that silicon wafers are opaque to measuring light regardless of their temperature.

The temperature-dependence of transmittance is still excessively great when light of a wavelength longer than 1 $\mu$m is used. If light of an excessively short wavelength is used, the value of transmittance is excessively small. Therefore, the wavelength of preferable light is in the range of 0.5 to 1.0 $\mu$m. Therefore, this embodiment uses a semiconductor laser that emits laser light of 0.78 $\mu$m in wavelength as a light source for reflectivity measurement.

As shown in FIG. 1, a reflectivity measuring system comprises a laser 7 and a photodetector 8 disposed on the opposite sides of the radiation thermometer 6, respectively. The laser 7 projects a laser beam of 0.78 $\mu$m in wavelength on the back surface of the wafer W, and the photodetector 8 receives the reflected laser beam from the back surface of the wafer W to measure reflectivity.

The laser 7 is disposed relative to the wafer W so that the laser beam projected by the laser 7 falls on and reflected by a reflectivity measuring spot in the back surface of the wafer W coinciding with a measuring spot for the radiation thermometer 6. Although the reflectivity measuring spot need not necessarily coincide with the measuring spot of the radiation thermometer 6, it is preferable that the reflectivity measuring spot coincides with the measuring spot of the radiation thermometer 6 in view of reducing causes of error.

The reflectivity measuring system comprising the laser 7 and the photodetector 8 need not necessarily be disposed in the processing vessel 1, and the same may be disposed on a wafer carrying path along which the wafer W is carried to the processing vessel 1.

The respective reflectivities of a plurality of silicon wafers differing from each other in surface condition are measured. The following steps (1), (2) and (3) for determining a proper calibration line are carried out to determine a slope and a y-intercept for a calibration line suitable for each of the plurality of silicon wafers.

Steps for Determining Proper Calibration Lines (1) Step of Performing Predetermined Processes A plurality of slopes and a plurality of y-intercepts for calibration lines are set, temperature of the wafer is measured by the radiation thermometer calibrated by each calibration line while the silicon wafer is subjected to an oxidation process according to two recipes (temperature conditions) by the lamp annealer to form an oxide film on a surface of the silicon wafer.

(2) Step of Expressing Results of Processing by Equation

Since temperature is measured by the radiation thermometer calibrated on the basis of the calibration lines differing from each other in slope and y-intercept, the wafers are processed at different actual process temperatures even if the wafers are processed by the same recipe. Consequently, different oxide films of thicknesses corresponding to process temperatures measured by the radiation thermometer calibrated by using calibration lines defined by the sets of slope and y-intercept are formed. Therefore, the oxide film thickness can be expressed by an equation as a function of the slope and y-intercept of the straight line for each recipe.

For example, when silicon wafers having surfaces of a certain surface condition (mirror-finished surfaces in this case) are subjected to an oxidation process according to two recipes respectively prescribing 1100° C.×50 sec and 1050° C.×40 sec, while the temperature of the silicon wafers is measured by the radiation thermometer calibrated by the calibration lines, a relation shown in FIG. 3 is obtained. In FIG. 3, the y-intercepts of the calibration lines are naught, the slopes of the calibration lines are measured on the horizontal axis and the thickness of the oxide film formed on the wafer is measured on the vertical axis. The curves shown in FIG. 3 are determined by the least-square method. As obvious from FIG. 3, the oxide film thickness can be approximated by a quadratic expression as a function of the slope of the calibration line.

Figure 4:
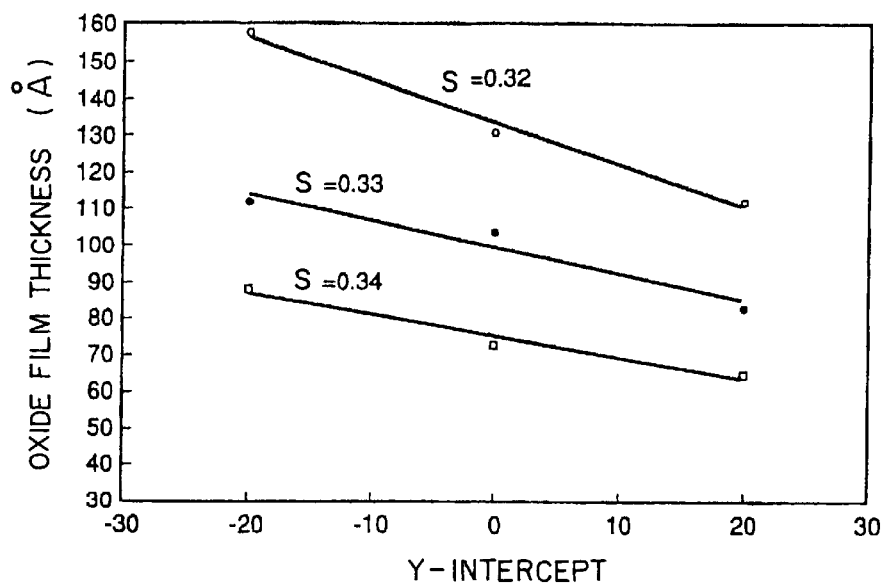
FIG. 4 is a graph showing the relation between oxide film thickness and the y-intercept of calibration lines for slopes when wafers are processed by an annealing process according to a recipe prescribing 1100° C.×50 sec.

FIG. 4 is a graph showing the relation between oxide film thickness and the y-intercept of calibration lines for slopes of 0.32, 0.33 and 0.34 when wafers are subjected to an oxidation process according to a recipe prescribing 1100° C.×sec. In FIG. 4, the y-intercepts of the calibration lines are measured on the horizontal axis and oxide films thickness is measured on the vertical axis. As obvious from FIG. 4, the oxide film thickness can be approximated by a linear expression as a function of the y-intercept of the calibration line.

Figure 5:
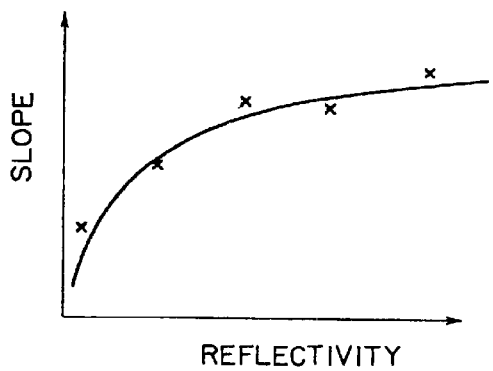
FIG. 5 is a graph showing the relation between the reflectivity of the back surface of a silicon wafer and the slope of a calibration line.
Figure 6:
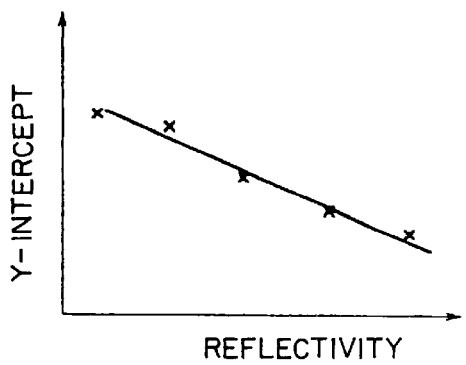
FIG. 6 is a graph showing the relation between the reflectivity of the back surface of a silicon wafer and the y-intercept of a calibration line.

The thickness of the oxide film (result of processing) is expressed by a quadratic expression as a function of the slope of the calibration line, and by a linear expression as a function of the y-intercept of the calibration line. Therefore, $$D=(a1 \cdot S+a0) \cdot F+(b2 \cdot S^2+b1 \cdot S+b0) \quad (1)$$

where D is the thickness of the oxide film, S is the slope of the calibration line, F is the y-intercept of the calibration line, and a0, a1, b0, b1 and b2 are optional constants, which can be determined from graphs shown in FIGS. 5 and 6 showing the relation between D and S, and F approximated by experiments.

Equations in the form of Expression (1) can be obtained for the two recipes prescribing process conditions of, for example, 1100° C.×50 sec (thickness D1) and 1050° C.×40 sec (thickness D2).

$$D1=(27 \cdot 125 \cdot S-9 \cdot 7496) \cdot F+(12732 \cdot 8 \cdot S^2-11304 \cdot S+2446 \cdot 6)$$

$$D2=(13 \cdot 333 \cdot S-4 \cdot 9015) \cdot F+(15670 \cdot 3 \cdot S^2-11839 \cdot S+2261 \cdot 3)$$

(3) Step of Calculating Slope and Y-intercept of Calibration Line

A reference oxide film thickness for each recipe, i.e., the thickness of the oxide film passably accurately reflecting the effect of the temperature prescribed by each recipe, is determined for each of the sample silicon wafers used in the experiments and having mirror-finished surfaces. More concretely, the radiation thermometer is calibrated on the basis of the temperatures measured by a thermocouple attached to the wafer, and the wafer is processed by the oxidation process according to the recipe, while the temperature of the wafer is measured. The thickness of the oxide film thus formed is used as a reference oxide film thickness for each recipe.

The values of the reference oxide film thicknesses are substituted into the two equations and the simultaneous equations consisting of those two equations are solved to calculate the slope S and y-intercept F of the calibration line. The slope S and the y-intercept F thus calculated are those of a suitable calibration line proper to the same silicon wafer.

The steps (1) to (3) for determining a proper calibration line are executed for each of the plurality of silicon wafers respectively having different surface conditions to determine the slope and y-intercept of a proper calibration line for each of the plurality of silicon wafers.

The calibration table denoting the relation between the slope and y-intercept of the proper calibration line and the reflectivity of the silicon wafer can be produced on the basis of the respective values of the slopes and y-intercepts of the calibration lines for the silicon wafers, and the respective reflectivities of the silicon wafers. FIG. 5 shows a quadratic curve approximating the relation between the reflectivities of five silicon wafers respectively having different surface conditions and the slopes of the calibration lines, and FIG. 6 shows a straight line approximating the relation between the reflectivities of the five silicon wafers and the y-intercepts of the calibration lines.

The radiation thermometer is calibrated by using the proper calibration line having the slope and y-intercept on the basis of those relations (the calibration table or the like) to measure the temperature of the silicon wafer. Consequently, the temperature of the silicon wafer can accurately be measured regardless of the surface condition of the silicon wafer. When the thickness of the film as the result of processing corresponding to process temperature is used instead of the temperature measured by the thermocouple, problems resulting from an error in the measured temperature due to the variable contact condition of the thermocouple can be avoided.

Radiation noise generated in the processing vessel 1 of the lamp annealer (processing system) affects slightly the error in the temperature measured by the radiation thermometer as well as the difference in surface condition between the wafers. In this embodiment, the radiation thermometer is calibrated on the basis of the result of actual processing by the oxidation process. Accordingly, in actual temperature measurement during the same process, the radiation thermometer is calibrated in higher accuracy taking into consideration the effect of radiation noise generated in the processing vessel (processing system ) 1.

Test 1

A plurality of silicon wafers respectively having different surface roughnesses were processed by the oxidation process to form oxide films on the silicon wafers. The process temperature was controlled on the basis of temperatures measured by the radiation thermometer calibrated by using the proper calibration lines for wafers of different surface conditions. The respective thicknesses of the oxide films were measured. Silicon wafers in comparative examples were processed by the oxidation process and the process temperature was controlled on the basis of temperatures measured by the radiation thermometer calibrated by using a single calibration line having a fixed slope S of 0.355 and a fixed y-intercept F of −31.13. A recipe prescribing a process condition of 1100° C.×50 sec was used. Test results are shown in FIG. 7.

Figure 7:
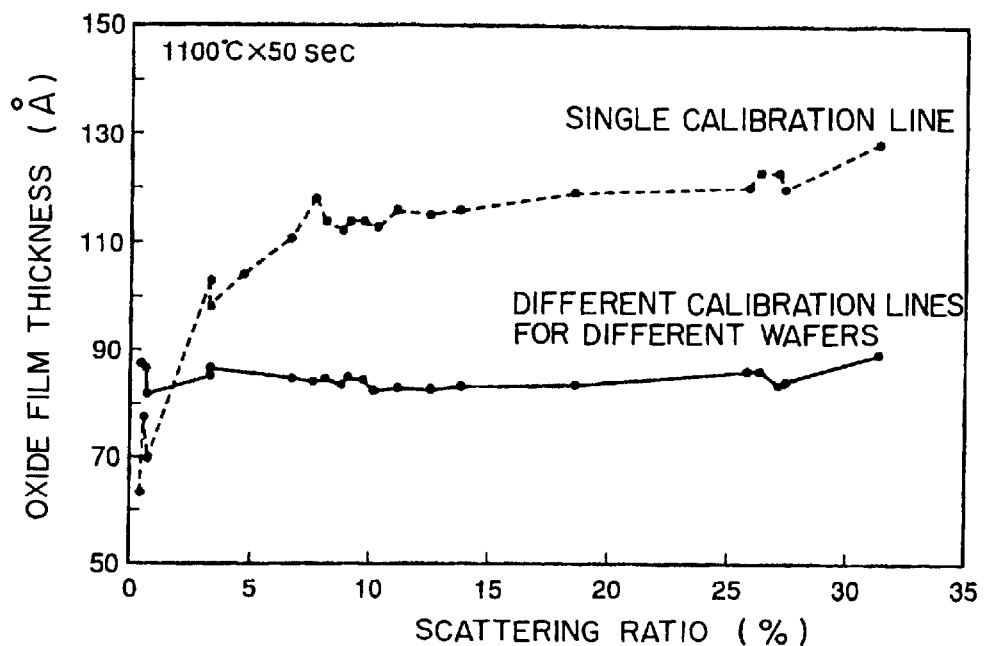
FIG. 7 is a graph comparatively showing the variation of oxide film thickness when silicon wafers are subjected to an annealing process and different calibration lines differing from each other in slope and y-intercept are set respectively for the silicon wafers respectively having different surface roughnesses, and that of oxide film thickness when silicon wafers are subjected to an annealing process and one and the same calibration line of a slope and a y-intercept is set for silicon wafers respectively having different surface roughnesses.

In FIG. 7, scattering ratio, i.e., an index of the surface roughness of the back surface of the silicon wafer, is measured on the horizontal axis and oxide film thickness is measured on the vertical axis. As obvious from FIG. 7, the range of variation of the thickness of the oxide films formed by the oxidation process in which the radiation thermometer was calibrated by using the calibration lines respectively proper to silicon wafers having different surface conditions, indicated by a solid line, is far narrower than the same of the oxide films in comparative examples formed by the oxidation process in which the radiation thermometer was calibrated by using the single calibration line, indicated by a broken line.

Incidentally, the mean of the measured thicknesses of the oxide films was 84.4 Å and the standard deviation was 1.78 Å (2.11%) when the oxide films were formed by the oxidation process in which the radiation thermometer was calibrated by using the calibration lines proper to the silicon wafers having different surface conditions, whereas the mean of the measured thicknesses of the oxide films was 109.0 Å and the standard deviation was 17.40 Å (15.96%) when the oxidation films were formed by the oxidation process in which the radiation thermometer was calibrated by using the single calibration line.

As mentioned above, the thickness of the oxide film formed by the oxidation process reflects the effect of process temperature accurately. The test results proved that the temperature of silicon wafers respectively having different surface roughnesses can accurately be measured by the temperature measuring method of the present invention using the radiation thermometer.

Test 2

A plurality of silicon wafers respectively having different surface roughnesses were processed by the oxidation process to form oxide films on the silicon wafers by a procedure similar to that employed in Test 1. The process temperature was controlled on the basis of temperatures measured by the radiation thermometer calibrated by using the proper calibration lines for wafers of different surface conditions. Process temperatures were 900° C., 1100° C. and 1200° C., and processing time was 50 sec. The respective thicknesses of the oxide films were measured. Measured results are shown in FIG. 8.

Figure 8:
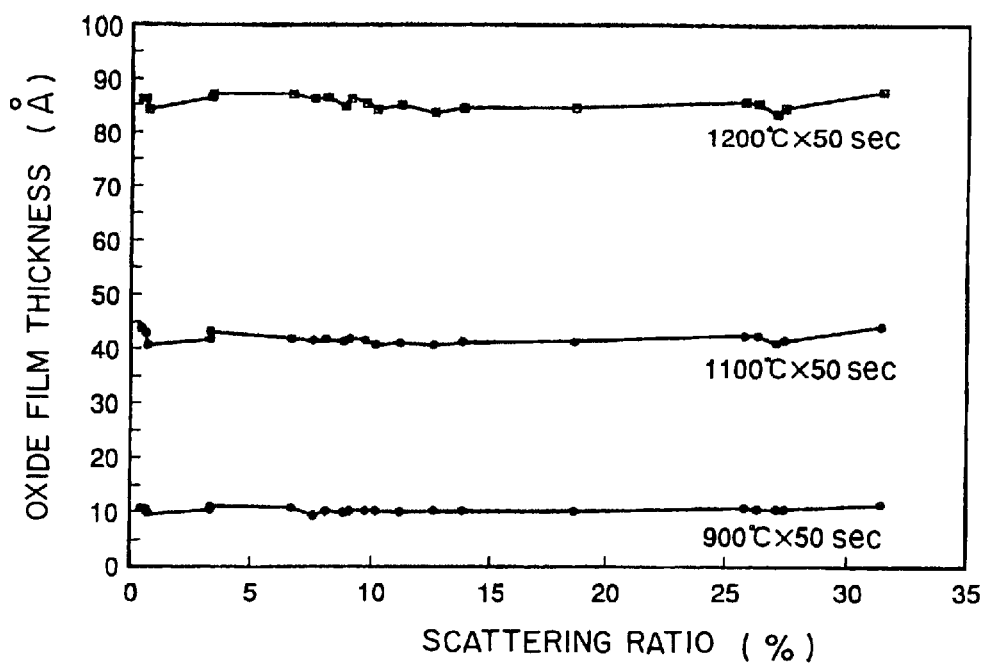
FIG. 8 is a graph showing the variation of oxide film thickness when silicon wafers are subjected to annealing processes of different process temperatures and different calibration lines differing from each other in slope and y-intercept are set respectively for the silicon wafers respectively having different surface roughnesses.

In FIG. 8, scattering ratio, i.e., an index of the surface roughness of the back surface of the silicon wafer, is measured on the horizontal axis and oxide film thickness is measured on the vertical axis. As obvious from FIG. 8, the test proved that the range of variation of the thickness of the oxide films attributable to the difference in surface roughness between the silicon wafers is very narrow regardless of process temperature. The test proved also that the present invention is able to measure accurately the temperature of silicon wafers respectively having different surface roughnesses by the radiation thermometer regardless of process temperature.

Modifications

The present invention is not limited in its practical application to the preferred embodiment specifically described herein and many changes and variations may be made therein.

For example, the embodiment described herein performs the oxidation process (annealing process) as a predetermined process that provides a result of processing corresponding to process temperature, and calibrates the radiation thermometer on the basis of the oxide film thickness as the result of processing. The present invention is not limited thereto in its practical application, but can be applied to other processes including a CVD process for depositing a metal film, insulating film forming processes for forming insulating films of $SiO_2$, SiOF, $CF_x$, and the like, and dielectric film forming processes for forming dielectric films of $Ta_2O_5$ and the like because the thickness of those films reflects the effect of process temperature. The present invention is applicable to processes other than film forming processes when the results of the processes reflect the effect of process temperature.

The measuring object is not limited to a semiconductor wafer, such as a silicon wafer. The temperature measuring method of the present invention is applicable various thermal processes other than the annealing process.

What is claimed is:

1. A temperature measuring method of measuring a temperature of an object by a radiation thermometer capable of approximating the relation between its output and an actual temperature of the object by a predetermined straight line and of being calibrated by properly determining a slope and a y-intercept for the straight line, said measuring method comprising the steps of:

(a) repeating a procedure including the steps of measuring a reflectivity of the object regarding the light of a wavelength that is not transmitted by the object, and determining a slope and a y-intercept for a proper straight line for the object on the basis of results of processing the object by a process that provides a result corresponding to process temperature, for a plurality of objects, to determine the relation between the reflectivity of the object, and the slope and y-intercept of the proper straight line; and (b) calibrating the radiation thermometer on the basis of the relation, and determining the temperature of the object with the calibrated thermometer.

2. The temperature measuring method according to claim 1, wherein the process is a film forming process, and the result of processing is a thickness of a film.

3. A temperature measuring method of measuring a temperature of an object by a radiation thermometer capable of approximating the relation between its output and an actual temperature of the object by a predetermined straight line and of being calibrated by properly determining a slope and a y-intercept for the straight line, said measuring method comprising the steps of:

(a) preparing a plurality of objects differing from each other in surface condition and measuring a reflectivity of each object regarding the light of a wavelength that is not transmitted by the same object;

(b) determining a slope and a y-intercept for a proper straight line for each object;

(c) determining the relation between the reflectivity of the object, and the slope and y-intercept of the proper straight line on the basis of the determined slope and y-intercept of the straight line for each object and the measured reflectivity of each object; and (d) calibrating the radiation thermometer on the basis of the relations and determining the temperature of the object with the calibrated thermometer;

wherein the step of determining a slope and a y-intercept for the straight line comprises the steps of:

i. setting a plurality of slopes and a plurality of y-intercepts for the straight line,
 ii. measuring temperature by the radiation thermometer by using each of the slope and y-intercept for the straight line and subjecting each object to a predetermined process that provides a result corresponding to process temperature by two recipes;
 iii. expressing the result of processing by an equation as a function of the slope and y-intercept of the straight line for each recipe;
 iv. determining a reference value of the result of processing for each recipe; and
 v. calculating a slope and y-intercept for a proper straight line for the by substituting the reference value into the equation fro each recipe.

4. The temperature measuring object according to claim 3, wherein the step of calculating a slope and a y-intercept for the straight line uses, as the reference value of the result of processing for each recipe, the result of processing according to the recipe performed while the temperature of the object is measured by the radiation thermometer calibrated on the basis of temperatures measured by a thermocouple attached to the object.

5. The temperature measuring method according to claim 3, wherein the predetermined process to which each object is subjected is a film forming process, and the result of processing is the thickness of the film.

6. The temperature measuring method according to claim 4, wherein the predetermined process to which each object is subjected is a film forming process, and the result of processing is the thickness of the film.

7. The temperature measuring method according to claim 5, wherein the film forming process is an oxidation process, and the equation used in the step of expressing the result of processing by an equation as a function of the slope and y-intercept of the straight line is:

$$D=(a1 \cdot S+a0) \cdot F+(b2 \cdot S^2+b1 \cdot S+b0)$$

where D is the thickness of the oxide film, S is the slope of the straight line, F is the y-intercept of the straight line, and a0, a1, b0, b1 and b2 are optional constants.

8. The temperature measuring method according to claim 6, wherein the film forming process is an oxidation process, and the equation used in the step of expressing the result of processing by an equation as a function of the slope and y-intercept of the straight line is:

$$D=(a1 \cdot S+a0) \cdot F+(b2 \cdot S^2+b1 \cdot S+b0)$$

where D is the thickness of the oxide film, S is the slope of the straight line, F is the y-intercept of the straight line, and a0, a1, b0, b1 and b2 are optional constants.

* * * * *